(12) United States Patent
Sugalski

(10) Patent No.: US 8,061,305 B2
(45) Date of Patent: Nov. 22, 2011

(54) LEASH HANDLE WITH AN INTEGRATED COMPARTMENT

(76) Inventor: Eric Sugalski, Arlington, MA (US)

( * ) Notice: Subject to any disclaimer, the term of this patent is extended or adjusted under 35 U.S.C. 154(b) by 680 days.

(21) Appl. No.: 11/536,278

(22) Filed: Sep. 28, 2006

(65) Prior Publication Data
US 2008/0006223 A1    Jan. 10, 2008

Related U.S. Application Data

(60) Provisional application No. 60/721,553, filed on Sep. 29, 2005.

(51) Int. Cl.
*A01K 27/00* (2006.01)
(52) U.S. Cl. ...................................................... 119/795
(58) Field of Classification Search .......... 119/795–798, 119/792, 794; 294/1.3; 220/756, 4.24, 4.21, 220/676; 242/405.2, 400, 405.3, 400.1, 588.3, 242/588.4, 588.5, 588.6
See application file for complete search history.

(56) References Cited

U.S. PATENT DOCUMENTS

| 5,441,017 | A | 8/1995 | Lindsay |
| 5,826,547 | A | 10/1998 | Gajewska |
| 6,019,067 | A | 2/2000 | Carey |
| 6,076,717 | A | 6/2000 | Edwards et al. |
| 6,223,695 | B1 | 5/2001 | Edwards et al. |
| 6,240,881 | B1 | 6/2001 | Edwards et al. |
| D527,495 | S | 8/2006 | Bird |
| 2003/0154931 | A1* | 8/2003 | Ostrowiecki .................. 119/796 |
| 2006/0118062 | A1* | 6/2006 | Edwards ....................... 119/796 |
| 2006/0272595 | A1* | 12/2006 | Edwards ....................... 119/795 |
| 2007/0132252 | A1* | 6/2007 | Cioloboc ....................... 294/1.3 |
| 2007/0267531 | A1* | 11/2007 | Petersen .................... 242/588.6 |

FOREIGN PATENT DOCUMENTS

| WO | WO 03069986 A1 * | 8/2003 |
| WO | WO 2006039816 A1 * | 4/2006 |

OTHER PUBLICATIONS

Dog Products, http://web.archive.org/web/20031011012342/http://petzone.com/DogE1.html.*

* cited by examiner

*Primary Examiner* — Son T Nguyen

(57) ABSTRACT

A leash handle includes a grip, a mounting post, and a midsection provided with an integrated storage compartment. The grip is configured for convenient gripping in one hand by a user. The mounting post is configured for connection to the looped end of a strap leash. A manually openable door or wall element provides access to the storage compartment.

13 Claims, 7 Drawing Sheets

FIG. 1
FIG. 2
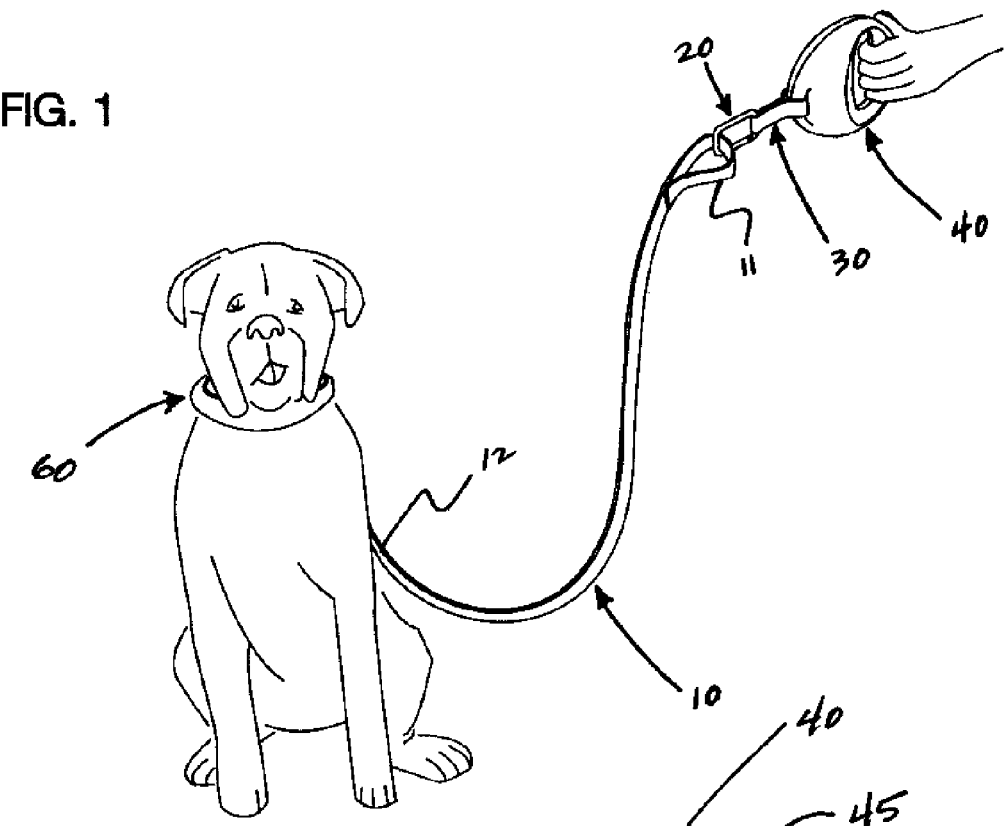
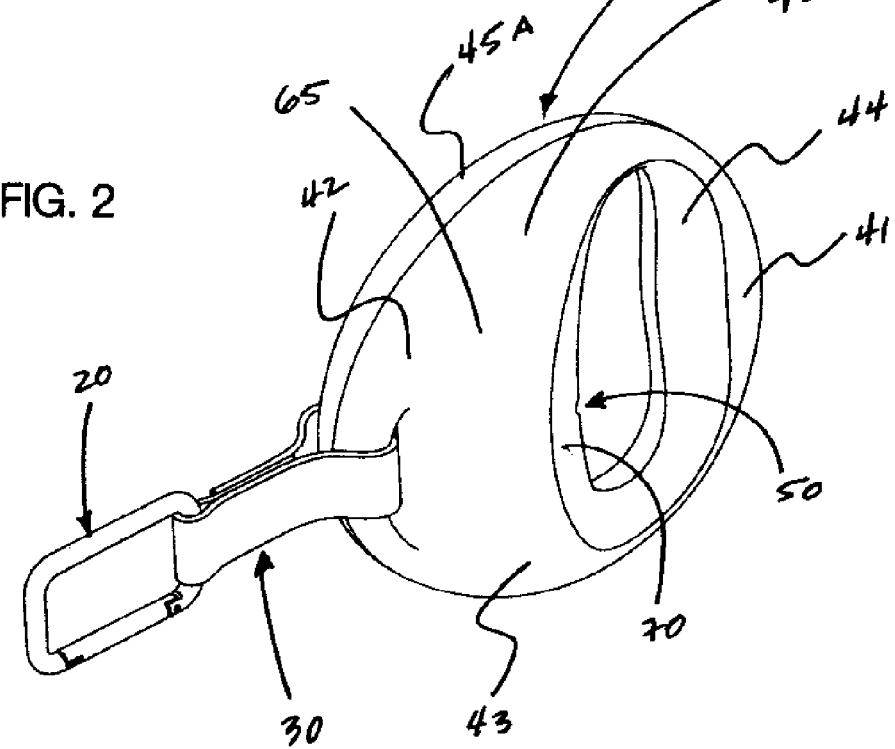

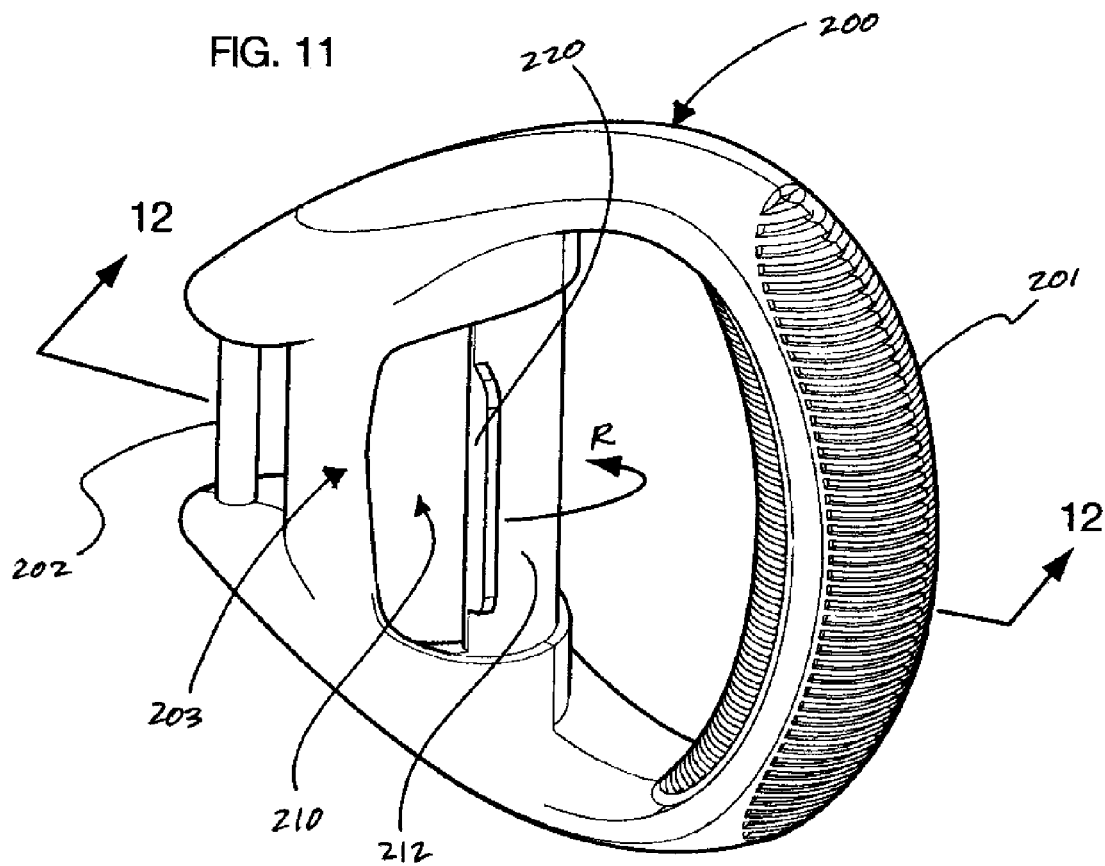
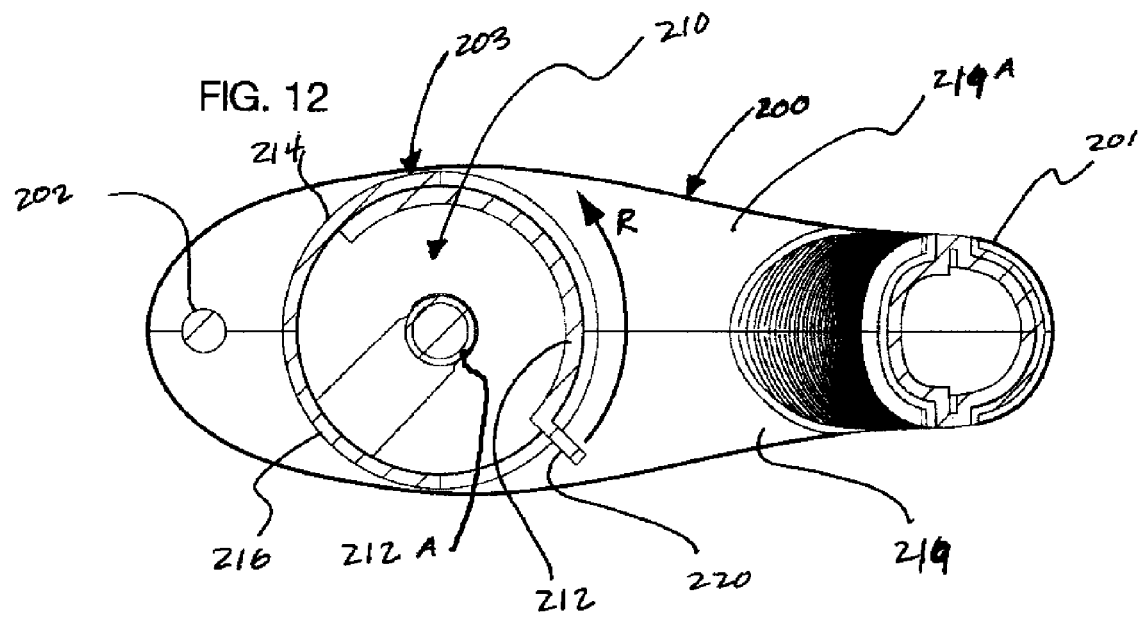

LEASH HANDLE WITH AN INTEGRATED COMPARTMENT

CROSS-REFERENCES TO RELATED APPLICATIONS

This application claims benefit of U.S. Provisional Patent Application Ser. No. 60/721,553, filed Sep. 29, 2005.

INCORPORATION-BY-REFERENCE OF MATERIAL SUBMITTED ON A COMPACT DISC

Not Applicable.

STATEMENT REGARDING FEDERALLY SPONSORED RESEARCH OR DEVELOPMENT

Not Applicable.

BACKGROUND OF THE INVENTION

1. Field of Invention

The present invention relates to a handle configured for connection to a leash for walking a pet such as a dog or cat. More particularly, the invention relates to a handle of the above-described type with an integrated storage compartment for storing articles while walking the pet.

2. Background Art

One common leash includes an elongated flexible strap with a connector (e.g., a hook or buckle) at one end for connection to apparatus (e.g., a collar or harness) secured to a pet, and a loop at the other end for gripping by the user while walking the pet. A second common leash includes a cord that is spring-coiled into a rigid plastic housing, with the free end of the cord having a connector for connection to the collar or harness on the pet. One advantage of this second type of retractable leash is that the housing is typically provided with a formed handle or grip section that is preferred by some people as compared with gripping the flexible looped end of the strap leash.

Prior arrangements provide add-on or connected article storage capability for the strap type leash, such as in Sebastian, U.S. Pat. No. 5,718,192; Conboy, U.S. Pat. No. 5,727,500; Carey, U.S. Pat. No. 6,019,067; and Saunders, U.S. Pat. No. D-492,454. Arrangements, such as in Edwards et al., U.S. Pat. No. 6,076,717, provide add-on or connected storage capability for the retractable leash. Edwards et al., U.S. Pat. No. 6,223,695 includes a refuse bag dispenser integrated in the rigid handle of a retractable leash. However, no prior arrangement includes a storage compartment that is integrated into a rigid handle configured for connection to a leash by a user. Additionally, no prior leash arrangement includes a rigid handle with an integrated compartment that is configured for general purpose storage of articles while walking a pet.

SUMMARY OF THE INVENTION

The general objective of the present invention is to provide a new and unique leash handle that addresses the above-described drawbacks and disadvantages of prior leashes and leash handles.

A detailed objective of the invention is to achieve the foregoing by providing a leash handle adapted for connection to a flexible leash and provided with an integrated storage compartment.

Another detailed objective of the invention is to achieve the foregoing by providing a leash handle with an integrated compartment that is configured for general purpose storage of articles while walking a pet.

Another detailed objective of the invention is to provide a leash handle with an integrated compartment that is configured for alternate use as a general purpose storage compartment and as a compartment for storing and dispensing refuse bags.

These and other objectives and advantages of the invention will become more apparent from the following detailed description when taken in conjunction with the accompanying drawings.

Briefly, the above-noted and additional objectives of the invention are accomplished with a generally rigid leash handle having a grip section, a mounting post or other connector element, and a mid-section provided with an integrated storage compartment and means for manual access to the interior of the storage compartment. The grip is configured for convenient gripping in one hand by a user. The connector element is configured for connection to one end of a leash, such as but not limited to the looped end of a conventional strap leash. In certain embodiments, the storage compartment includes an elastic (i.e., flexible) aperture element such as a door or wall, and access to the compartment is provided with one or more elastically openable slots in the aperture element, thereby establishing a flexibly openable door or wall element into the compartment. In preferred embodiments, the storage compartment is sized to hold a roll of refuse bags, and the slots are sized for convenient dispensing of the bags from the compartment. In other embodiments, the storage compartment is provided with rotatably or pivotally openable elements such as wall segments, doors, covers, and the like for access to the storage compartment. In preferred embodiments, the leash handle includes two identical handle halves secured together from front to back.

BRIEF DESCRIPTION OF THE DRAWINGS

FIG. 1 is a view of a first embodiment leash handle with an integrated storage compartment, in accordance with the invention, the leash handle being shown in use—with a leash that is connected to the collar on a dog.

FIG. 2 is a front perspective view of the leash handle shown in FIG. 1.

FIG. 11 is a rear perspective view of a third embodiment leash handle, in accordance with the invention.

FIG. 12 is a cross-sectional view taken along the line 12-12 of FIG. 11.

Figure 3:
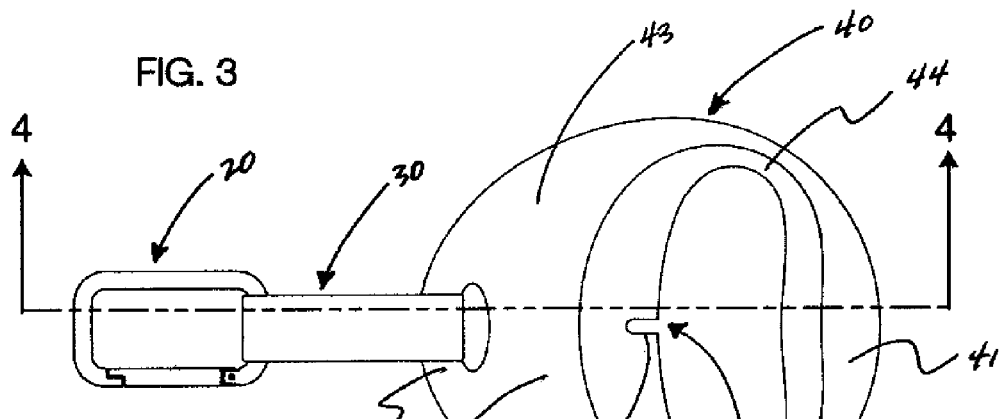
FIG. 3 is a side elevational view of the leash handle shown in FIG. 1.

While the invention is susceptible of various modifications and alternative constructions, certain illustrated embodiments have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE INVENTION

For purposes of illustration, a first embodiment leash handle 40, in accordance with the invention, is shown in FIG. 1 in connection with a leash 10 having a looped end 11 (a first end) that is releasably connected to the handle, and having an animal end 12 (an opposite or second end) that is connected to the collar 60 on a dog. In this instance, the looped end of the leash is removably connected to a snap ring 20 with a spring clip, the snap ring is connected to a connecting strap 30, and the connecting strap is connected to the handle. However, the connection arrangement between the leash and handle may be provided for the user's convenience. For example, the leash may be configured for connection directly to the handle, such as with a snap hook at one end of the leash, or the snap ring may be connected directly to the handle, or a non-openable ring may be provided in place of the snap ring. Those skilled in the art will appreciate that additional alternate connecting arrangements may be provided between the leash and handle without departing from the invention.

Referring to FIGS. 2-5, the leash handle 40 is shown to have a gripping portion or grip 41 at one end (the rear end when in normal use), a mounting post 42 at an opposite end (the front end), and a main body 65 or mid-section located between the grip and the mounting post. The grip extends generally vertically and is configured for convenient gripping in one hand by a user. The mounting post is configured for connection of the leash to the handle, and in preferred embodiments, also extends generally vertical in order to not extend laterally beyond the sides of the main body and provide for an overall streamlined leash handle. In the embodiment shown, the connecting strap 30 is attached around the mounting post. Alternately, for example, either the snap ring 20 or the leash 10 can be attached directly to the mounting post.

The leash handle 40 further includes an integrated storage compartment 50 and means to access the storage compartment. Thus, the handle enables a user to conveniently store and carry articles 51 in the handle such as while walking a dog. Such articles as may be stored in the compartment would include but not be limited to car keys, dog treats, and plastic bags, including rolls of plastic bags.

The storage compartment 50 is established in the mid-section of the handle 40, located generally horizontally between the grip 41 and the mounting post 42 with the handle in a generally horizontal, normal use position such as shown in FIG. 3. More particularly, as shown in FIGS. 4-5, the storage compartment 50 is established by a hollow portion and generally enclosing walls of the main body 65 of the handle, with means to access the storage compartment provided in said walls.

Figure 4:
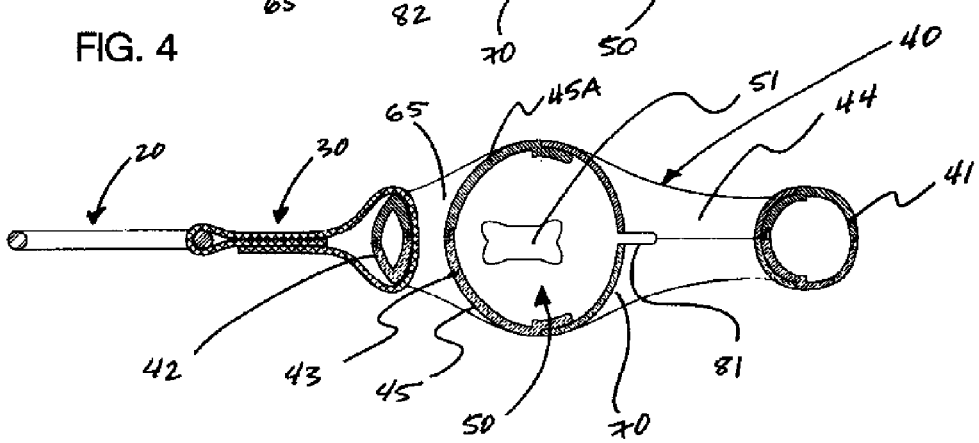
FIG. 4 is a cross-sectional view taken along the line 4-4 of FIG. 3, and showing an aperture wall in an un-flexed, closed condition.
Figure 5:
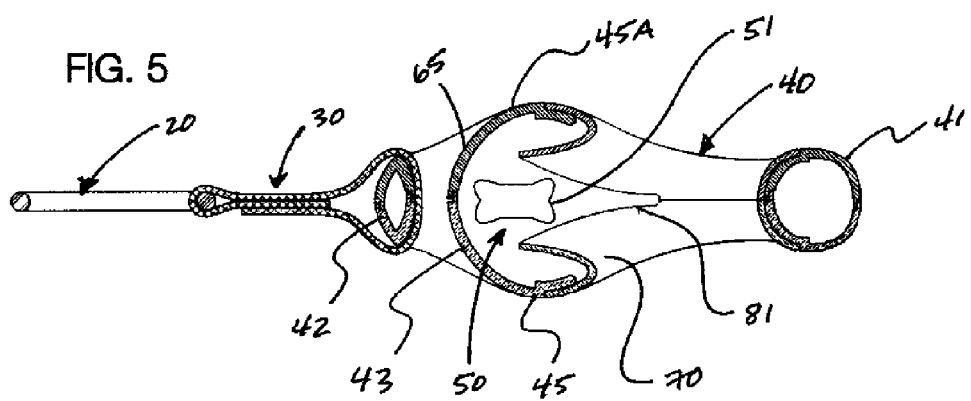
FIG. 5 is a view similar to FIG. 4, but showing the aperture wall in a flexed, opened condition.
Figure 6:
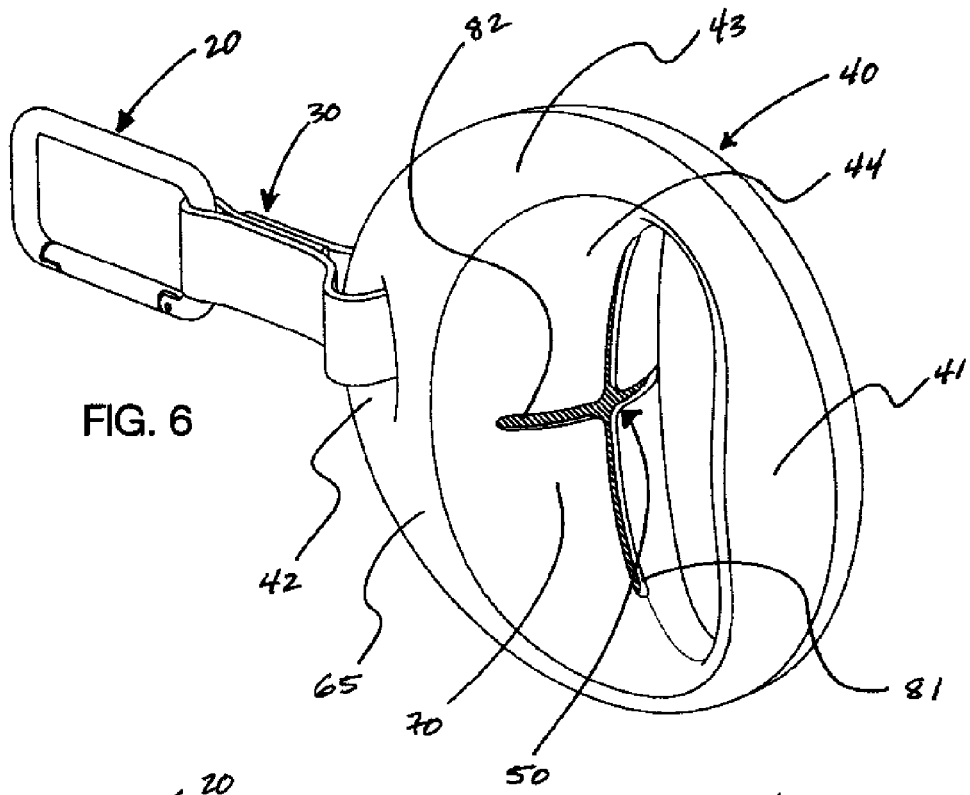
FIG. 6 is a rear perspective view the leash handle shown in FIG. 1.
Figure 7:
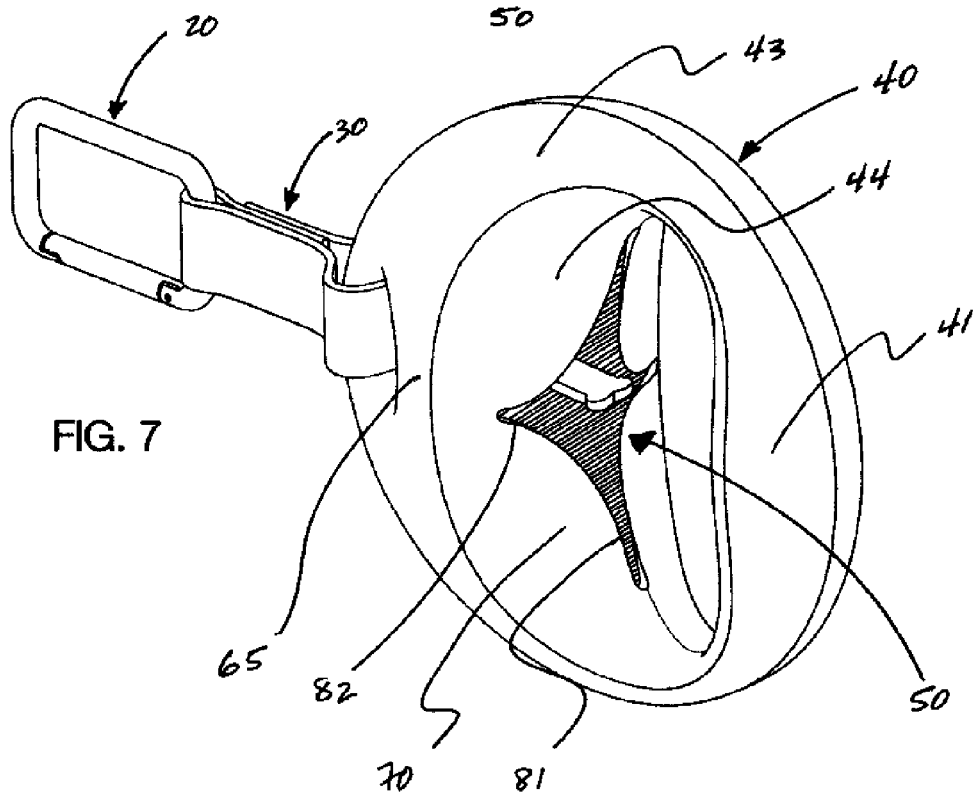
FIG. 7 is a view similar to FIG. 6, but showing the aperture wall in the flexed, opened condition shown in FIG. 5.

Referring to FIGS. 3-7, means to access the compartment 50 of the handle 40 includes an aperture wall 70 at the back side thereof. The aperture wall contains a vertical slot 81 and a horizontal slot 82 that connects to or intersects the vertical slot. The aperture wall is elastic, enabling it to resiliently flex when a generally normal force acts upon it and return to its un-flexed condition upon removal of such force. In FIGS. 4 and 6, the aperture wall is shown in its un-flexed condition. In FIGS. 5 and 7, the aperture wall is shown in a flexed inwardly condition, providing access to the storage compartment 50, and enabling an article 51 to be placed into or removed from the storage compartment. In this instance, flexing of the aperture wall causes the horizontal and vertical slots to expand. As the slots expand, the storage compartment becomes accessible. In use, a person could press an item through the aperture wall, thus expanding the slots, to provide entry into the storage compartment. Similarly, in removing an item during use, a person would manually expand the slots (flexing the aperture wall either inwardly or outwardly), thus gaining access to the storage compartment, such as by inserting a finger and a thumb through the aperture wall and into the compartment. The person could then pinch or grip the article and pull it through the aperture wall.

The vertical slot 81 and the horizontal slot 82 also enable a plastic bag to protrude through either of the slots while in use. The slots are sized, when in their un-flexed condition, such that frictional resistance is applied to the plastic bag when protruding through the slots, thus preventing the bag from inadvertently retracting into the storage compartment. When a plastic bag is protruding through the slots, it becomes easily accessible by the user. As the preferred storage compartment is designed to receive (through slots 81, 82) and hold rolls of plastic bags, the individual bags can be pulled from the storage compartment through the slots and torn off as needed, and the following bag protrudes from the slots. This operation is similar to that of typical tissue dispensers.

In the preferred embodiment shown, the leash handle 40 includes a handle half 45 with a handle body 43 and a rubber portion 44. The handle body is manufactured through an injection molding process using a rigid material, such as plastic. The handle body contains half (one side) of the rigid wall portions of the storage compartment 50. The elastic portion is manufactured through an overmolding process, wherein the elastic portion is injection molded over the handle body, therein permanently bonding the elastic portion to the handle body. Alternatively, the elastic portion could be manufactured of a separate elastic part that is positioned and secured in between opposing handle halves. The elastic portion is manufactured of an elastic material, such as rubber or a thermo-plastic elastomer, commonly known in the art as TPE, such as Santoprene™. The elastic portion contains half (one side) of the aperture wall 70 of the storage compartment. The elastic portion also covers part (the front and part of the sides) of the grip 41, which, in use, provides a comfortable gripping region on the inside of the grip. Referring to FIG. 3, to complete the leash handle 40, a second handle half 45A which is identical to handle half 45 (and produced as described above in relation to handle half 45), is glued, fastened, snapped, welded or otherwise secured to handle half 45. As shown in FIGS. 4 and 5, the two handle halves 45, 45A join together and cooperatively form the storage compartment therebetween. The handle halves 45, 45A also cooperatively form the mounting post 42 and the grip 41.

Figure 8:
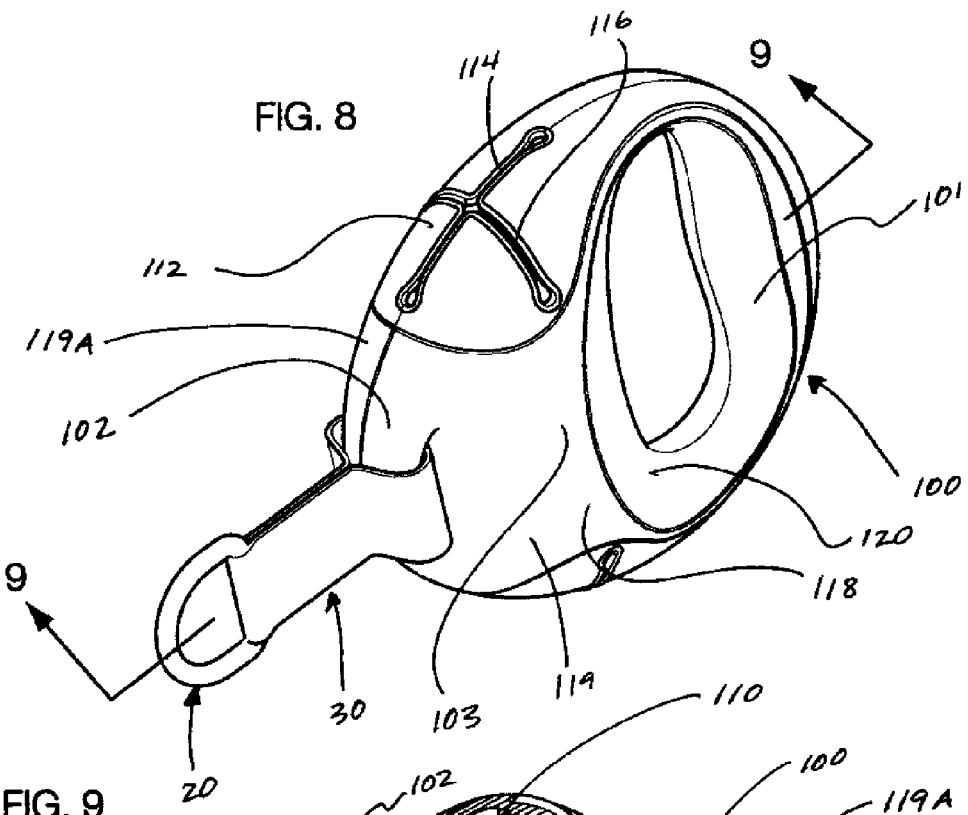
FIG. 8 is front perspective view of a second embodiment leash handle, in accordance with the invention.
Figure 9:
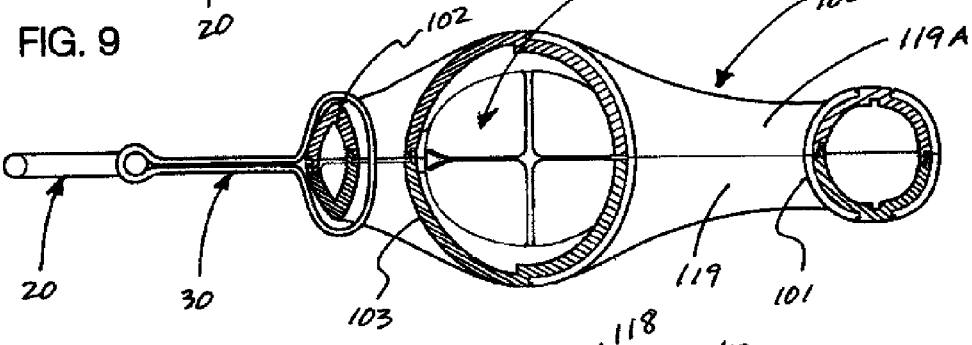
FIG. 9 is a cross-sectional view taken along the line 9-9 of FIG. 8.
Figure 10:
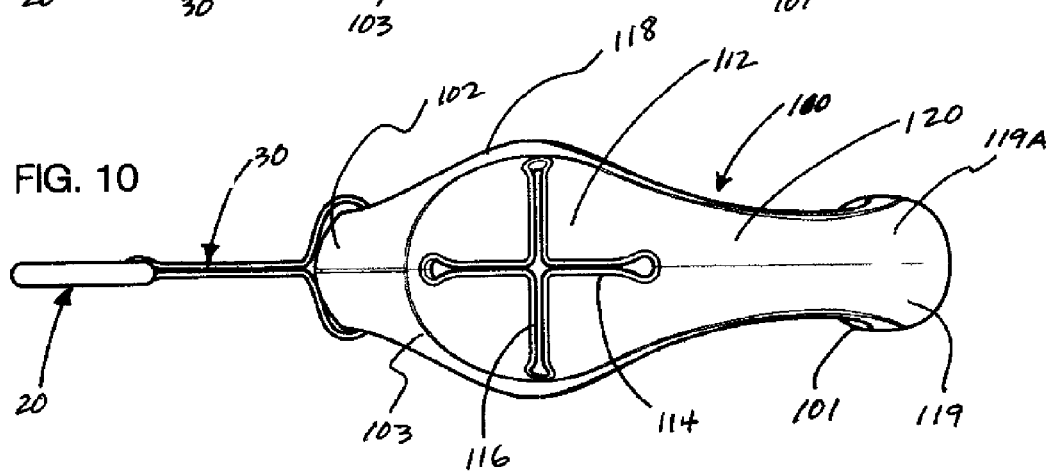
FIG. 10 is a top plan view of the leash handle shown in FIG. 8.

As further illustration, a second embodiment leash handle 100, in accordance with the invention, is shown in FIGS. 8-10.

The leash handle 100 includes a grip 101 at the back end, a mounting post 102 at the front end, and a main body 103 or mid-section located between the grip and mounting post. The grip extends generally vertically and is configured for convenient gripping in one hand by a user. The mounting post is configured to enable connection between the handle and a leash. In the embodiment shown, the connecting strap 30 is attached around the mounting post, and the snap ring 20 is secured to the connecting strap for releasable connection of the leash 100 thereto. The connection between the mounting post and the leash may be alternately provided, such as described above, for the user's convenience.

The leash handle 100 further includes an integrated storage compartment 110 and means to access the storage compartment. Thus, the handle enables a user to conveniently store and carry articles in the handle, as generally described above in relation to leash handle 40.

The storage compartment 110 is established in the mid-section of the handle 100, located generally horizontally between the grip 101 and the mounting post 102. More particularly, as shown in FIGS. 8-9, the storage compartment 110 is established by a hollow portion and generally enclosing walls of the main body 103 of the handle, with means to access the storage compartment provided in said walls.

In this embodiment, means to access the compartment 110 of the handle 100 includes a pair of aperture walls 112 at the top and bottom sides thereof. The aperture walls each contain a pair of intersecting slots 114, 116. The aperture walls are elastic, enabling them to resiliently flex when a generally normal force acts upon the wall and return to their un-flexed condition upon removal of such force. In FIGS. 8-9, the aperture walls are shown in their un-flexed condition, but will flex as generally shown in FIGS. 5 and 7 in relation to the first embodiment described above, thereby providing access to the storage compartment 110, and enabling an article to be placed into or removed from the storage compartment. In the embodiment shown in FIGS. 8-9, flexing of one of the aperture walls causes the longitudinal slot 114 and cross slot 116 to expand. As the slots expand, the storage compartment becomes accessible for inserting and removing an article from the storage compartment as described above.

The vertical slot 114 and the horizontal slot 116 also enable a plastic bag to protrude through either of the slots while in use. The slots are sized, when in their un-flexed condition, such that frictional resistance is applied to the plastic bag when protruding through the slots, thus preventing the bag from inadvertently retracting into the storage compartment. When a plastic bag is protruding through the slots, it becomes easily accessible by the user. As the preferred storage compartment is designed to receive (through slots 114, 116) and hold rolls of plastic bags, the individual bags can be pulled from the storage compartment through the slots and torn off as needed, and the following bag protrudes from the slots. This operation is similar to that of typical tissue dispensers.

In the preferred embodiment shown, the leash handle 100 includes a handle half 119 with a handle body 118, an outer elastic portion 120 and an inner elastic portion 122. The handle body is manufactured through an injection molding process using a rigid material, such as plastic. The handle body contains half (one side) of the rigid wall portions (the front and sides) of the storage compartment 110. The elastic portions are manufactured through an overmolding process, wherein the elastic portions are injection molded over the handle body, therein permanently bonding the elastic portions to the handle body. Alternatively, the elastic portions could be manufactured of separate elastic parts positioned and secured in between opposing handle halves. The elastic portions are manufactured of an elastic material, such as rubber or a thermo-plastic elastomer, commonly known in the art as TPE, such as Santoprene™. The outer elastic portion contains half (one side) of the aperture walls 112 of the storage compartment, while the inner elastic portion contains half of the back side of the storage compartment. The elastic portions also cover part (the front, back and part of the sides) of the grip 101, which, in use, provides a comfortable gripping region on the inside of the grip. The handle half 119 is horizontally symmetric, with its overall profile (in all directions) similar to handle half 45 of leash handle 40. To complete the leash handle 100, a second handle half 119A which is identical to handle half 119 (and produced as described above in relation to handle half 119), is glued, fastened, snapped, welded or otherwise secured to handle half 119. The two handle halves 119, 119A join together and cooperatively form the storage compartment therebetween. The handle halves 119, 119A also cooperatively form the mounting post 102 and the grip 101.

As further illustration, a third embodiment leash handle 200, in accordance with the invention, is shown in FIGS. 11-12.

The leash handle 200 includes a grip 201 at the back, a mounting post 202 at the front, and a main body or mid-section 203 located between the grip and mounting post. The grip extends generally vertically and is configured for convenient gripping in one hand by a user. The mounting post is configured to enable connection between the handle and a leash. The connection between the mounting post and the leash may be provided for the user's convenience, such as described above in relation to a connecting strap, a snap ring, or the looped end of the leash. The mounting post 202 shown can be a rigid post, such as metal or plastic, and can be a separate part or integrated into the handle half 219.

The leash handle 200 further includes an integrated storage compartment 210 and means to access the storage compartment. Thus, the handle enables a user to conveniently store and carry articles in the handle, as generally described above in relation to leash handle 40.

The storage compartment 210 is established in the handle 200, located generally horizontally between the grip 201 and the mounting post 202. More particularly, as shown in FIGS. 11-12, the storage compartment 210 is established by a hollow portion and generally enclosing walls of the main body 203 of the handle, with means to access the storage compartment provided in said walls.

In this embodiment, means to access the compartment 210 of the handle 200 includes a wall segment or door 212 that rotates to provide entry to the storage compartment at the back side thereof. As shown in FIGS. 11-12, the door is rotatably carried in the body on posts 212A such as extending towards the center of the compartment from the top and the bottom of the door and being rotatably supported by cylindrical bearing surfaces on the housing halves, for rotation about a vertical axis generally through the center of the compartment. The door is shown in a partially opened condition in FIGS. 11-12. When a generally tangential force (with respect to the center of rotation) acts on the door (in a counter-clockwise direction when viewed from above as in FIG. 12), the door rotates towards open as indicated by arrow "R," thereby providing access to the storage compartment 210, and enabling an article to be placed into or removed from the storage compartment. When a generally tangential force acts on the door in the opposite direction, it rotates towards a closed position. In preferred embodiments, the door is further provided with a friction or gripping section, such as a series of closely spaced vertical indentations or ridges on the outer surface of the door, or the tab 220 shown, for ease of manually applying the opening or closing force onto the door. An optional spring may also be provided, such as connected between a fixed location on the handle body and the movable door, to bias the door towards the closed position, such that it resiliently closes upon removal of the opening force.

The preferred storage compartment is designed to receive (through opened door 212) and hold rolls of plastic bags. When the door is closed, one of the individual bags can protrude through a small slot established where the rotate tab 220 meets the body. When the bags are pulled tangentially through the slot, the bag roll advances and the individual bags can be removed from the compartment. Advantageously, the roll of bags may be rotatably carried between the posts 212A about which the door rotates.

In the preferred embodiment shown, the leash handle 200 includes a handle half 216 manufactured through an injection molding process using a rigid material, such as plastic. The handle half contains half (one side) of the rigid wall portions (front and side portions) of the storage compartment 210. The door 212 can be molded from rigid plastic, or from, for example, TPE with some elastic flexure quality, and contains half (back and side portions) of the storage compartment. The handle half 219 is horizontally symmetric, with its overall profile (in all directions) similar to handle half 45 of leash handle 40. To complete the leash handle 200, a second handle half 219A which is identical to handle half 219 (and produced as described above in relation to handle half 219), is glued, fastened, snapped, welded or otherwise secured to handle half 219. The two handle halves 219, 219A join together and cooperatively form, with the aperture wall 212, the storage compartment therebetween. The handle halves 219, 219A also cooperatively form the grip 201. In this instance, the mounting post 202 is a separate post, held in position at the front of the leash handle by the two handle halves 219, 219A when joined together.

Figure 13:
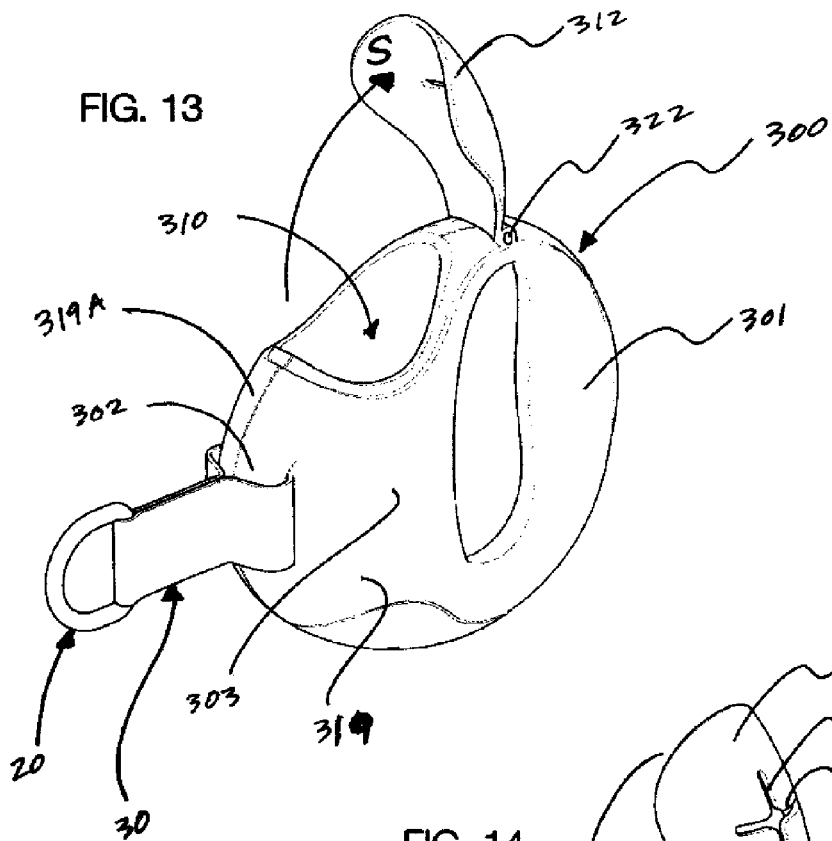
FIG. 13 is a front perspective view of a fourth embodiment leash handle, in accordance with the invention.
Figure 14:
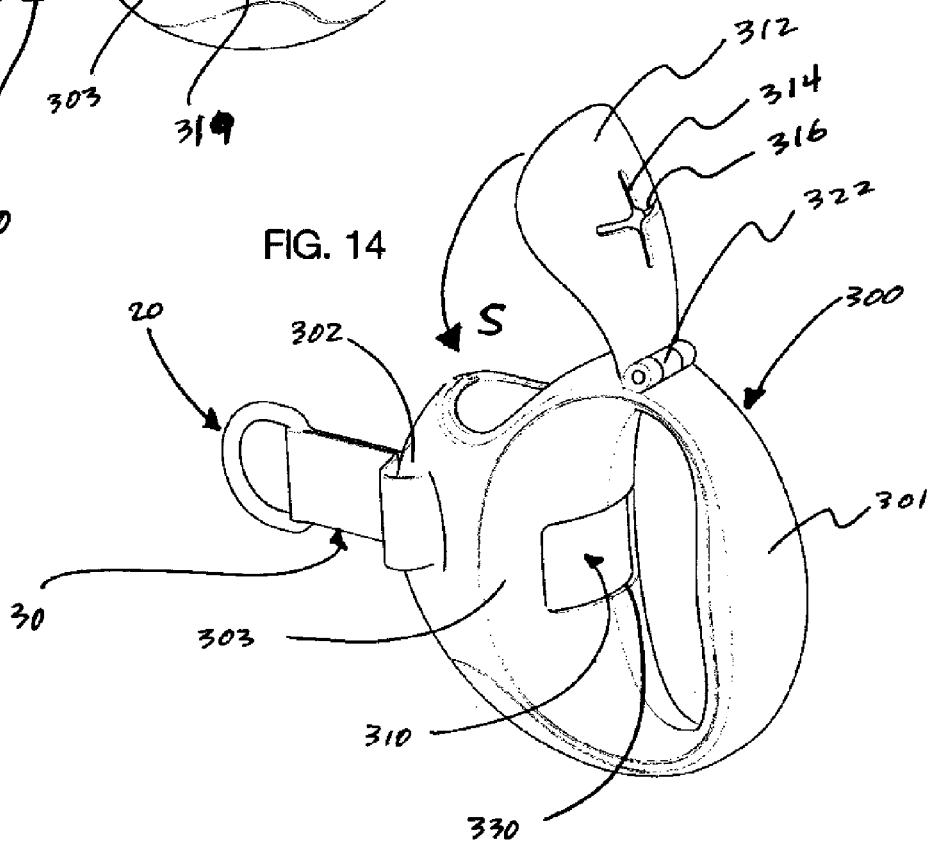
FIG. 14 is a cross-sectional view taken along the line 14-14 of FIG. 13.

As further illustration, a fourth embodiment leash handle 300, in accordance with the invention, is shown in FIGS. 13-14.

The leash handle 300 includes a grip 301 at the back end, a mounting post 302 at the front end, and a main body 303 or mid-section located between the grip and mounting post. The grip extends generally vertically and is configured for convenient gripping in one hand by a user. The mounting post is configured to enable connection between the handle and a leash. The connection between the mounting post and the leash may be provided for the user's convenience, such as described above in relation to a connecting strap, a snap ring, or the looped end of the leash.

The leash handle 300 further includes an integrated storage compartment 310 and means to access the storage compartment. Thus, the handle enables a user to conveniently store and carry articles in the handle, as generally described above in relation to leash handle 40.

The storage compartment 310 is established in the handle 300, located generally horizontally between the grip 301 and the mounting post 302. More particularly, as shown in FIGS. 13-14, the storage compartment 310 is established by a hollow portion and generally enclosing walls of the main body 303 of the handle, with means to access the storage compartment provided in said walls.

In this embodiment, means to access the compartment 310 of the handle 300 includes wall segments 312 located at the top and bottom sides thereof and hinged at 322 to pivot away from and towards the handle and compartment, to provide access to the storage compartment at the top and bottom of the handle. When a generally tangential force (with respect to the hinge pivot axis) acts on the wall segments 312 in a direction away from the handle, the wall segments pivot towards open as indicated by arrow "S," thereby providing access to the storage compartment 310, and enabling an article to be placed into or removed from the storage compartment. When a generally tangential force acts on the wall segments in the opposite direction, it rotates towards a closed position. Optional lips or tabs or other protruding elements may be provided on the wall segments for gripping and pivoting thereof. Optional springs may also be provided to bias the wall segments towards the closed position.

In the preferred embodiment shown, the leash handle 300 includes a handle half 319 manufactured through an injection molding process using a rigid material, such as plastic. The handle half contains half (one side) of the rigid wall portions (front and side portions) of the storage compartment 310. The wall segments 312 can be molded from rigid plastic, or from, for example, TPE with some elastic flexure quality, and contain half (top and bottom portions) of the storage compartment. To complete the leash handle 300, a second handle half 319A which is identical to handle half 319 (and produced as described above in relation to handle half 319), is glued, fastened, snapped, welded or otherwise secured to handle half 319. The two handle halves 319, 319A join together and cooperatively form, with the aperture walls 312, the storage compartment therebetween. The handle halves 319, 319A also cooperatively form the grip 301 and the mounting post 302 when joined together. The hinges may be established with hinge pins, or they may be provided as "living hinges" molded with the associated part of the handle.

As shown in FIGS. 13-14, the wall segments 312 of the leash handle 300 may be optionally provided with intersecting slots 314, 316 to establish aperture walls. In this instance, the wall segments 312 may be generally elastic, enabling the slots to resiliently flex and un-flex, as described above in relation to slots 114, 116 of leash handle 100, for alternate access to the storage compartment 310 without having to pivot open the wall segments 312. In this instance, the slots are preferably sized to enable a plastic bag to protrude therethrough, and when in their un-flexed condition, such that frictional resistance is applied to the protruding plastic bag, thus preventing the bag from inadvertently retracting into the storage compartment. The preferred storage compartment is designed to receive (through open wall segments 312) and hold rolls of plastic bags such that the individual bags can be pulled from the storage compartment through the slots, and the following bag protrudes from the slots.

As shown in FIG. 14, an optional window 330 is cut into the handle body 303. When a roll of bags is contained in the storage compartment 310, individual bags may be removed through the window 330. When individual bags are pulled through the window 330, the roll of bags rotates, thus providing access to the next bag.

Figure 15:
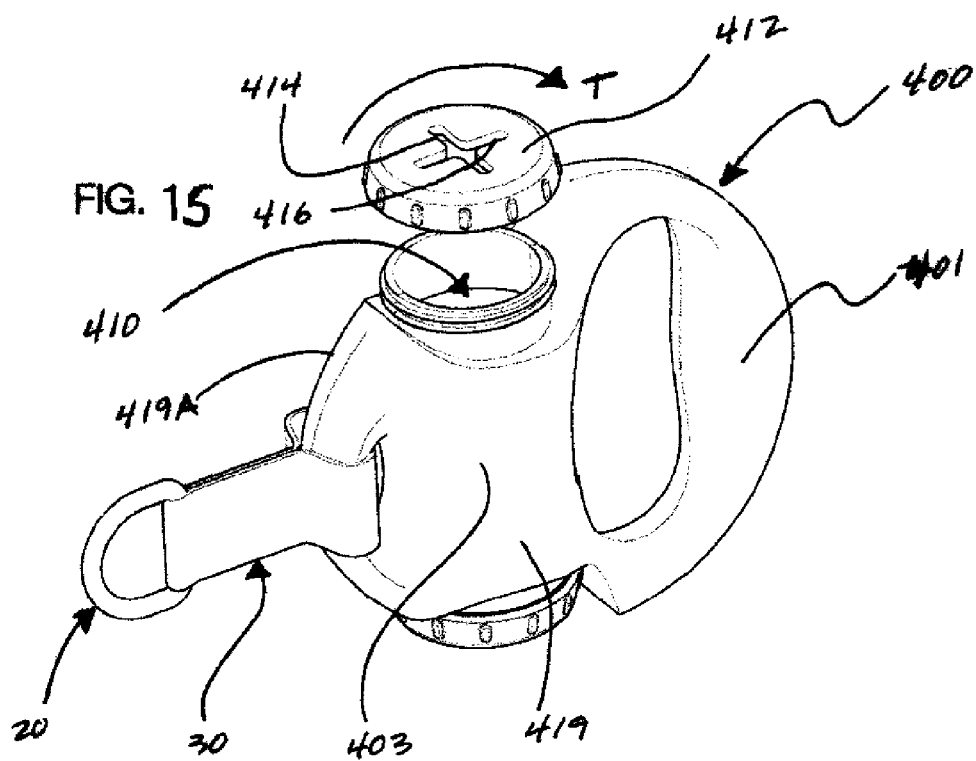
FIG. 15 is a front perspective view of a fifth embodiment leash handle, in accordance with the invention.
Figure 16:
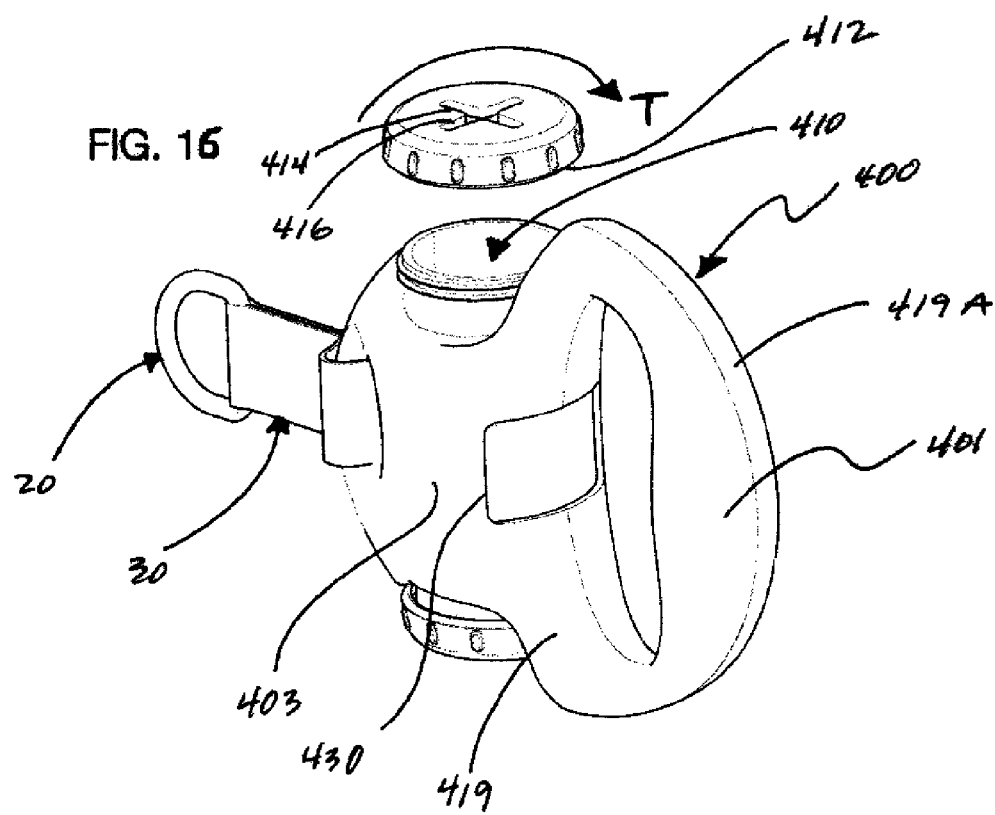
FIG. 16 is a rear perspective view of the fifth embodiment leash handle shown in FIG. 15.

As further illustration, a fifth embodiment leash handle 400, in accordance with the invention, is shown in FIGS. 15-16.

The leash handle 400 includes a grip 401 at the back end, a mounting post 402 at the front end, and a main body 403 or mid-section located between the grip and mounting post. The grip extends generally vertically and is configured for convenient gripping in one hand by a user. The mounting post is configured to enable connection between the handle and a leash. The connection between the mounting post and the leash may be provided for the user's convenience, such as described above in relation to a connecting strap, a snap ring, or the looped end of the leash.

The leash handle 400 further includes an integrated storage compartment 410 and means to access the storage compartment. Thus, the handle enables a user to conveniently store and carry articles in the handle, as generally described above in relation to leash handle 40.

The storage compartment 410 is established in the handle 400, located generally horizontally between the grip 401 and the mounting post 402. More particularly, as shown in FIGS. 15-16, the storage compartment 410 is established by a hollow portion and generally enclosing walls of the main body 403 of the handle, with means to access the storage compartment provided in said walls.

In this embodiment, means to access the compartment 410 of the handle 400 includes covers in the form of caps 412 located at the top and bottom sides and threaded at 422 for installing onto and removal from the handle by rotation thereof, to provide access to the storage compartment at the top and bottom of the handle. The caps can be tethered to the handle or they can be free.

In the preferred embodiment shown, the leash handle 400 includes a handle half 419 manufactured through an injection molding process using a rigid material, such as plastic. The handle half contains half (one side) of the rigid wall portions (front, side and top and bottom portions) of the storage compartment 410. The caps 412 can be molded from rigid plastic, or can be provided from any other convenient material, and contains portions of the top and bottom of the storage compartment. To complete the leash handle 400, a second handle half 419A which is identical to handle half 419 (and produced as described above in relation to handle half 419), is glued, fastened, snapped, welded or otherwise secured to handle half 419. The two handle halves 419, 419A join together and cooperatively form, with the aperture walls 412, the storage compartment therebetween. The handle halves 419, 419A also cooperatively form the grip 401 and the mounting post 402 when join together.

As shown in FIGS. 15-16, the caps 412 of the leash handle 400 may be optionally provided with intersecting slots 414, 416 to establish aperture walls. The tops of the caps may be made from elastic material, enabling the slots to resiliently flex and un-flex, as described above in relation to slots 114, 116 of leash handle 100, for alternate access to the storage compartment 410 without having to remove the cap. In this instance, the slots are preferably sized to enable a plastic bag to protrude therethrough, and when in their un-flexed condition, such that frictional resistance is applied to the protruding plastic bag, thus preventing the bag from inadvertently retracting into the storage compartment. The preferred storage compartment is designed to receive (through the opening exposed with the cap removed) and hold rolls of plastic bags such that the individual bags can be pulled from the storage compartment through the slots, and the following bag protrudes from the slots.

As shown in FIG. 16, an optional window 430 is cut into the handle body 403. When a roll of bags is contained in the storage compartment 410, individual bags may be removed through the window 430. When individual bags are pulled through the window 430, the roll of bags rotates, thus providing access to the next bag.

From the foregoing, it will be apparent that the present invention brings to the art a new and unique leash handle with an integrated storage compartment.

I claim:

1. A leash handle for use with a flexible leash, the leash handle comprising:

a) two handle halves secured together; the two handle halves each having a front, a back, a top and a bottom;
 i) the two handle halves forming a rigid storage compartment with a front, a back, a top and a bottom;
  a) the interface between the two handle halves extending along the front, back, top and bottom of the storage compartment; wherein the front of the handle halves establish the front of the storage compartment, the back of the handle halves establish the back of the storage compartment, the top of the handle halves establish the top of the storage compartment, and the bottom of the handle halves establish the bottom of the storage compartment;
  ii) the two handle halves further forming an access slot at the interface of the two handle halves for introducing and removing an article from the storage compartment; wherein said access slots include flexible elastomeric elements that are manually openable and closeable as the elements are flexed and un-flexed, respectively; and wherein the elastomeric flexible elements are permanently attached to the rigid storage compartment;
b) a hand grip with a top end and a bottom end; the hand grip extending in a continuous lengthwise segment between the top end and the bottom end for gripping thereof by the user;
 i) the hand grip being spaced rearwardly of the storage compartment to define a space therebetween for the user's fingers when the user is gripping the hand grip;
c) top and bottom connecting means integrally connecting the top and bottom of the storage compartment with the top and bottom ends of the hand grip, respectively;
 i) the top and bottom connecting means being spaced apart, above and below said space, respectively, to enclose the top and bottom of said space for the user's fingers when the user is gripping the hand grip; and
d) leash connecting means connected at the front of the storage compartment.

2. The leash handle as defined in claim 1 wherein the two handle halves are formed of rigid molded plastic with an elastomeric element forming said access slot.

3. The leash handle as defined in claim 1 wherein the access slot is configured to slidably receive a roll of bags into the storage compartment, and the access slot is sized to frictionally grip a bag of the roll protruding from the storage compartment and slot.

4. The leash handle as defined in claim 1 in which each handle half includes a one-half access slot formation at an edge of the handle half, whereby the one-half access slot formations of the two handle halves cooperatively establish said access slot at the interface of the two handle halves.

5. The leash handle as defined in claim 4 wherein the two handle halves are identical.

6. The leash handle as defined in claim 4 wherein said handle halves each include a flexible element forming said access slot, said access slot being manually openable and closeable as the elements are flexed and un-flexed, respectively.

7. The leash handle as defined in claim 6 wherein the flexible element is located at the top of the storage compartment.

8. The leash handle as defined in claim 6 wherein the storage compartment is generally formed of rigid molded plastic and the flexible element is formed of an elastomer.

9. The leash handle as defined in claim 6 wherein the flexible element further includes a second slot that intersects with the first slot.

10. The leash handle as defined in claim 1 in which the elastic layer includes a plurality of elastomeric slots intersecting one another to establish said access openings.

11. A leash handle for use with a flexible leash, the leash handle comprising:
   a) a storage compartment with a front, a back, a top and a bottom;
      i) the top and the bottom of the storage compartment each having an access opening for introducing and removing an article from the storage compartment; and having a rigid segment surrounding the access opening; wherein said access openings each include a flexible elastomeric element forming an access slot that is manually openable and closeable as the element is flexed and un-flexed, respectively; and wherein the flexible elastomeric elements are permanently attached to rigid segments of the storage compartment surrounding the access openings;
   b) a hand grip with a top end and a bottom end; the hand grip extending in a continuous lengthwise segment between the top end and the bottom end for gripping thereof by the user;
      i) the hand grip being spaced rearwardly of the storage compartment to define a space therebetween for the user's fingers when the user is gripping the hand grip;
   c) top and bottom connecting means integrally connecting the top and bottom of the storage compartment with the top and bottom ends of the hand grip, respectively;
      i) the top and bottom connecting means being spaced apart, above and below said space, respectively, to enclose the top and bottom of said space for the user's fingers when the user is gripping the hand grip; and
   d) leash connecting means connected at the front of the storage compartment.

12. A leash handle for use with a flexible leash, the leash handle comprising:
   a) a rigid portion forming:
      i) a storage compartment with a front, a back, a top and a bottom;
         a) the storage compartment having an access opening for introducing and removing an article from the storage compartment;
      ii) a hand grip with a top end and a bottom end; the hand grip extending in a continuous lengthwise segment between the top end and the bottom end for gripping thereof by the user;
         a) the hand grip being spaced rearwardly of the storage compartment to define a space therebetween for the user's fingers when the user is gripping the hand grip;
      iii) top and bottom connecting means integrally connecting the top and bottom of the storage compartment with the top and bottom ends of the hand grip, respectively;
         a) the top and bottom connecting means being spaced apart, above and below said space, respectively, to enclose the top and bottom of said space for the user's fingers when the user is gripping the hand grip; and
      iv) leash connecting means connected at the front of the storage compartment; and
   b) an elastomeric portion extending integrally from the storage compartment to the hand grip along the top and bottom connecting means; the elastomeric portion forming:
      i) a comfortable gripping region overlaying at least a portion of the hand grip; and
      ii) an access means over said access opening in the storage compartment for introducing and removing an article from the storage compartment.

13. The leash handle as defined in claim 12 wherein the rigid portion is molded plastic, and the elastomeric portion is permanently attached to the rigid molded plastic through an overmolding process in manufacturing.

* * * * *